United States Patent
Ouchi

(10) Patent No.: US 9,405,006 B2
(45) Date of Patent: Aug. 2, 2016

(54) COLLISION DETERMINATION DEVICE AND COLLISION DETERMINATION METHOD

(75) Inventor: Yusuke Ouchi, Susono (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 1 day.

(21) Appl. No.: 14/425,240

(22) PCT Filed: Sep. 3, 2012

(86) PCT No.: PCT/JP2012/072365
§ 371 (c)(1),
(2), (4) Date: Mar. 27, 2015

(87) PCT Pub. No.: WO2014/033957
PCT Pub. Date: Mar. 6, 2014

(65) Prior Publication Data
US 2015/0234044 A1    Aug. 20, 2015

(51) Int. Cl.
*G01S 13/93*    (2006.01)
*G01S 13/86*    (2006.01)
*G01S 13/08*    (2006.01)

(52) U.S. Cl.
CPC ............... *G01S 13/93* (2013.01); *G01S 13/08* (2013.01); *G01S 13/867* (2013.01); *G01S 13/86* (2013.01); *G01S 13/931* (2013.01)

(58) Field of Classification Search
CPC ....... G01S 13/86; G01S 13/867; G01S 13/93; G01S 13/931
USPC .............................. 342/27, 28, 52–55, 70–72
See application file for complete search history.

(56) References Cited

U.S. PATENT DOCUMENTS

| | | | | | |
|---|---|---|---|---|---|
| 5,585,798 | A | * | 12/1996 | Yoshioka | B60T 8/172 342/107 |
| 5,617,085 | A | * | 4/1997 | Tsutsumi | B60Q 9/008 180/167 |
| 6,492,935 | B1 | * | 12/2002 | Higuchi | G01S 13/931 342/54 |
| 6,590,521 | B1 | * | 7/2003 | Saka | G01S 13/931 180/167 |
| 6,771,208 | B2 | * | 8/2004 | Lutter | G01S 7/032 343/52 |
| 7,042,389 | B2 | * | 5/2006 | Shirai | G01S 13/867 342/104 |

(Continued)

FOREIGN PATENT DOCUMENTS

| JP | 2005-84034 A | 3/2005 |
|---|---|---|
| JP | 2010-18080 A | 1/2010 |

OTHER PUBLICATIONS

International Search Report for PCT/JP2012/072365 dated Oct. 9, 2012 [PCT/ISA/210].

*Primary Examiner* — Peter Bythrow
(74) *Attorney, Agent, or Firm* — Sughrue Mion, PLLC

(57) ABSTRACT

A collision determination device includes: a radar detection unit that detects an object in front of a vehicle using a radar wave; an image detection unit that captures an image in front of the vehicle and detects the object using the captured image; and a collision determination unit that determines a collision between the vehicle and the object based on a composite target which is generated using a detection result of the radar detection unit and a detection result of the image detection unit. The collision determination unit performs collision determination on the basis of the detection result of the image detection unit, instead of the collision determination based on the composite target, when it is determined that the object cannot be detected by the radar detection unit and can be detected by the image detection unit and the object is stationary in a traveling direction of the vehicle.

9 Claims, 7 Drawing Sheets

(56) References Cited

U.S. PATENT DOCUMENTS

| | | | | | |
|---|---|---|---|---|---|
| 7,432,848 B2* | 10/2008 | Munakata | ............ | G01S 13/931 | |
| | | | | | 342/118 |
| 7,729,858 B2* | 6/2010 | Koike | ................... | B60W 30/08 | |
| | | | | | 340/436 |
| 7,825,849 B2* | 11/2010 | Tsuchida | .............. | G01S 13/931 | |
| | | | | | 342/52 |
| 8,013,780 B2* | 9/2011 | Lynam | ..................... | B60T 7/22 | |
| | | | | | 342/52 |
| 2001/0031068 A1* | 10/2001 | Ohta | ........................ | G01C 3/08 | |
| | | | | | 382/103 |
| 2003/0011509 A1* | 1/2003 | Honda | .................... | G01S 7/412 | |
| | | | | | 342/70 |
| 2003/0201929 A1* | 10/2003 | Lutter | .................... | G01S 7/032 | |
| | | | | | 342/52 |
| 2005/0021201 A1* | 1/2005 | Klotz | .................... | B60W 30/16 | |
| | | | | | 702/189 |
| 2007/0080850 A1* | 4/2007 | Abe | ...................... | G01S 13/931 | |
| | | | | | 342/52 |

* cited by examiner

COLLISION DETERMINATION DEVICE AND COLLISION DETERMINATION METHOD

CROSS REFERENCE TO RELATED APPLICATIONS

This application is a National Stage of International Application No. PCT/JP2012/072365, filed on Sep. 3, 2012, the contents of all of which are incorporated herein by reference in their entirety.

TECHNICAL FIELD

The present invention relates to a collision determination device and a collision determination method that determine a collision between a vehicle and an object.

BACKGROUND ART

As a collision determination device and a collision determination method, for example, a device has been known which generates a composite target of an object using the detection result of a radar sensor and the detection result of an image sensor and determines a collision between a vehicle and the object on the basis of the generated composite target, as disclosed in Japanese Unexamined Patent Application Publication No. 2005-84034.

CITATION LIST

Patent Literature

[Patent Literature 1] Japanese Unexamined Patent Application Publication No. 2005-84034

SUMMARY OF INVENTION

Technical Problem

However, in the collision determination device and the collision determination method according to the related art, when the composite target is not generated since the object can be detected by the image sensor, but cannot be detected by the radar sensor, collision determination is not performed until the composite target is generated. Therefore, it takes a relatively long processing time until the composite target is generated and it is impossible to perform collision determination early.

Accordingly, the invention provides a collision determination device and a collision determination method that perform collision determination early even when a composite target is not generated.

Solution to Problem

According to an aspect of the invention, there is provided a collision determination device including: a radar detection unit that detects an object in front of a vehicle using a radar wave; an image detection unit that captures an image in front of the vehicle and detects the object using the captured image; and a collision determination unit that determines a collision between the vehicle and the object on the basis of a composite target which is generated using a detection result of the radar detection unit and a detection result of the image detection unit. The collision determination unit performs collision determination on the basis of the detection result of the image detection unit, instead of the collision determination based on the composite target, when it is determined that the object cannot be detected by the radar detection unit and can be detected by the image detection unit and the object is stationary in a traveling direction of the vehicle.

According to this structure, when the object cannot be detected by the radar detection unit and can be detected by the image detection unit and the collision determination unit determines that the object is stationary in the traveling direction of the vehicle, the collision determination is performed on the basis of the detection result of the image detection unit, instead of the collision determination based on the composite target. Therefore, the processing time is reduced by the determination of the stationary object by the collision determination unit and it is possible to perform the collision determination early on the basis of the detection result of the image detection unit.

The collision determination unit may determine whether the object is stationary in the traveling direction of the vehicle, on the basis of a ratio of a first distance variation which is calculated from a speed of the vehicle as a change in a distance between the vehicle and the object in the traveling direction of the vehicle per unit time and a second distance variation which is calculated from the detection result of the image as a change in the distance between the vehicle and the object in the traveling direction of the vehicle per unit time. According to this structure, it is possible to determine the stationary state of the object at a high speed, on the basis of the ratio of the first distance variation and the second distance variation.

The collision determination unit may determine that the object is stationary in the traveling direction of the vehicle when the ratio of the first distance variation and the second distance variation is less than a threshold value.

The collision determination unit may perform the collision determination on the basis of the detection result of the image detection unit when it is determined that the object is present outside a detection range of the radar detection unit and is present in a detection range of the image detection unit and the object is stationary in the traveling direction of the vehicle.

The collision determination unit may perform the collision determination on the basis of the detection result of the image detection unit when it is determined that the object is not detected by the radar detection unit and is detected by the image detection unit and the object is stationary in the traveling direction of the vehicle.

The collision determination unit may perform the collision determination on the basis of the detection result of the image detection unit when the composite target is generated and the generated composite target is cancelled.

The detection range of the radar detection unit and the detection range of the image detection unit may partially overlap each other and there may be a area which is not detected by the radar detection unit and is detected by the image detection unit.

The radar detection unit may detect the object in front of the vehicle using a millimeter wave.

According to another aspect of the invention, there is provided a collision determination method including: detecting an object in front of a vehicle using a radar wave; capturing an image in front of the vehicle and detecting the object using the captured image; determining a collision between the vehicle and the object on the basis of a composite target which is generated using a detection result of the radar detection and a detection result of the image detection; and performing collision determination on the basis of the detection result of the image detection, instead of the collision determination based on on the composite target, when it is determined that the object cannot be detected by the radar detection and can be detected by the image detection and the object is stationary in a traveling direction of the vehicle.

Advantageous Effects of Invention

According to the invention, it is possible to provide a collision determination device and a collision determination method that perform collision determination early even when a composite target is not generated.

DESCRIPTION OF EMBODIMENTS

Figure 1:
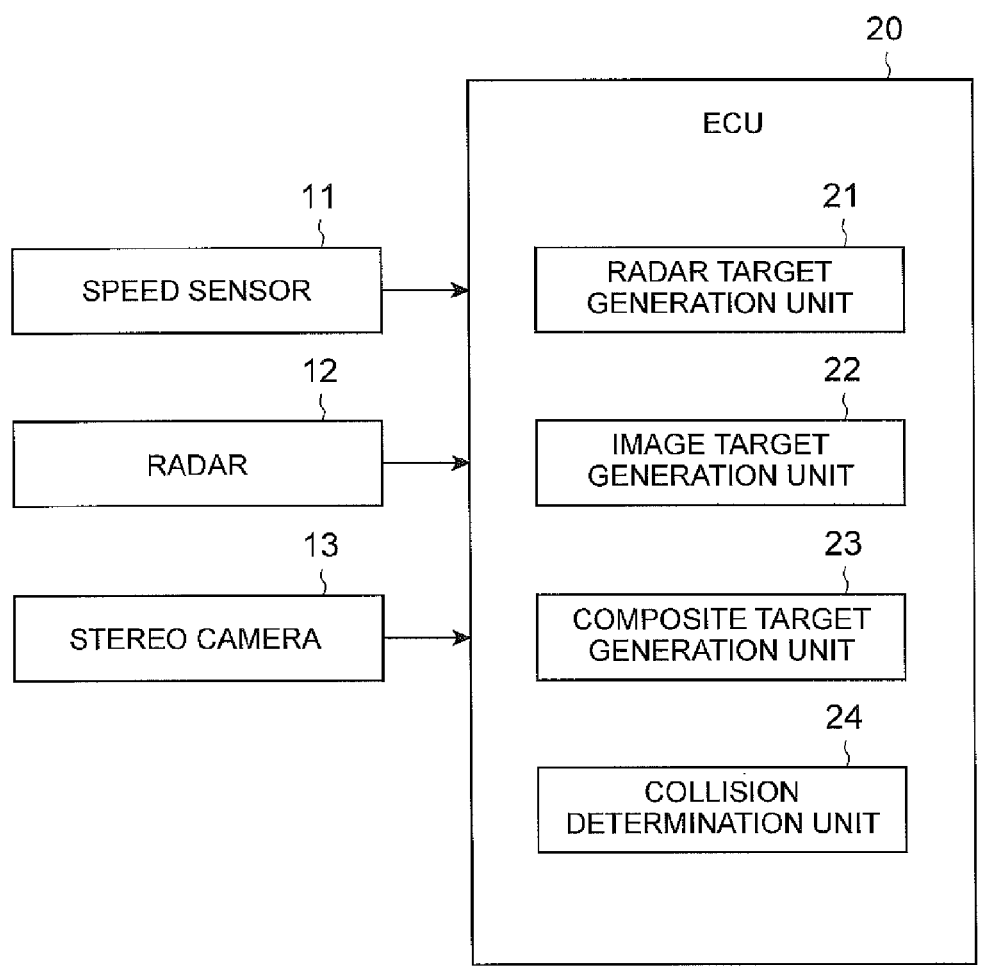
FIG. 1 is a block diagram illustrating the structure of a collision determination device according to an embodiment of the invention.

Hereinafter, an embodiment of the invention will be described in detail with reference to the accompanying drawings. In the description of the drawings, the same components are denoted by the same reference numerals and the description thereof will not be repeated.

First, the structure of a collision determination device according to an embodiment of the invention will be described with reference to FIGS. 1 and 2. The collision determination device is provided in a vehicle and determines a collision between the vehicle and an object using a radar sensor and an image sensor.

FIG. 1 is a block diagram illustrating the structure of the collision determination device according to the embodiment of the invention. As shown in FIG. 1, the collision determination device includes a speed sensor 11, a radar 12, a stereo camera 13, and an electronic control unit (ECU) 20.

The speed sensor 11 detects the speed of the vehicle. For example, a wheel speed sensor is used as the speed sensor 11. The speed sensor 11 supplies the detected vehicle speed to the ECU 20.

The radar 12 functions as a radar detection unit (radar sensor) which detects objects in front of the vehicle using radar waves, transmits radar waves (electromagnetic waves) in front of the vehicle, and receives radar waves reflected from an object. For example, a microwave radar, a millimeter-wave radar, an ultrasonic radar, or a laser radar is used as the radar 12. The radar 12 supplies radar detection information indicating the detection result of the object to the ECU 20.

The stereo camera 13 functions as an image detection unit (image sensor) which captures an image in front of the vehicle and detects an object using the captured image. For example, a charge-coupled device (CCD) or a complementary metal-oxide semiconductor (CMOS) sensor is used as the stereo camera 13. The stereo camera 13 includes a plurality of cameras and is provided on the front surface of the vehicle or in the cabin of the vehicle. The stereo camera 13 supplies image detection information indicating the detection result of the object to the ECU 20. A single camera may be used instead of the stereo camera 13.

The ECU 20 includes a radar target generation unit 21, an image target generation unit 22, a composite target generation unit 23, and a collision determination unit 24. The ECU 20 includes, for example, a CPU, a ROM, and a RAM as main components. The CPU executes a program to implement the functions of the radar target generation unit 21, the image target generation unit 22, the composite target generation unit 23, and the collision determination unit 24. The ECU 20 may be a single unit or it may include a plurality of units.

The radar target generation unit 21 generates a radar target on the basis of the radar detection information from the radar 12. The radar target has target information related to the distance to the object and the lateral position of the object which are calculated from the coordinates of the vehicle as a reference.

The target information of the radar target is calculated on the basis of the radar detection information from the radar 12. The distance to the object indicates the distance from the vehicle (radar 12) to the object in the traveling direction of the vehicle and is calculated on the basis of the time from the transmission of the radar wave from the radar 12 to the reception of the radar wave reflected from the object. The lateral position of the object indicates the distance from the vehicle (radar 12) to the object in a direction perpendicular to the traveling direction of the vehicle and is calculated on the basis of the direction (angle) of the radar wave which is reflected from the object and is then received. The lateral position of the radar target is information about the position of the object detected by the radar 12 and does not include information about the width of the object.

The image target generation unit 22 generates an image target on the basis of the image detection information from the stereo camera 13. The image target has target information related to the distance to the object and the lateral position of the object which are calculated from the coordinates of the vehicle as a reference. In addition, the image target generation unit 22 tracks the object on the basis of the image detection information, determines whether the object is in a stationary state, and supplies the tracking result and the determination result of the stationary state to the collision determination unit 24.

The target information of the image target is calculated by the principle of triangulation, on the basis of the deviation between the image detection information items of the left and right cameras forming the stereo camera 13, or is calculated on the basis of the detection size and position of, for example, a number plate of the vehicle in front. The distance to the object indicates the distance from the vehicle (stereo camera 13) to the object in the traveling direction of the vehicle. The lateral position of the object indicates the distance from the vehicle (stereo camera 13) to the object in a direction perpendicular to the traveling direction of the vehicle. The lateral position of the image target also includes the range of the object detected from the image in the lateral direction, that is, information about the width of the object. When the target information is calculated, for example, a process of averaging the calculated values may be performed in order to reduce a calculation error.

The composite target generation unit 23 generates a composite target of the object, using the target information of the radar target and the image target, that is, the detection results of the radar 12 and the stereo camera 13. The composite target is generated by collating the two targets on the basis of the target information of the radar target and the image target. The two targets are collated with each other on the basis of the similarity between the target information items of the two targets, that is, the similarity between the distances to the object and the lateral positions of the object. The composite target has target information related to the distance to the object and the lateral position (including the width) of the object. The target information of the composite target is based on the target information of the radar target and the image target and has higher accuracy than the target information of only the radar target or the target information of only the image target.

Figure 2:
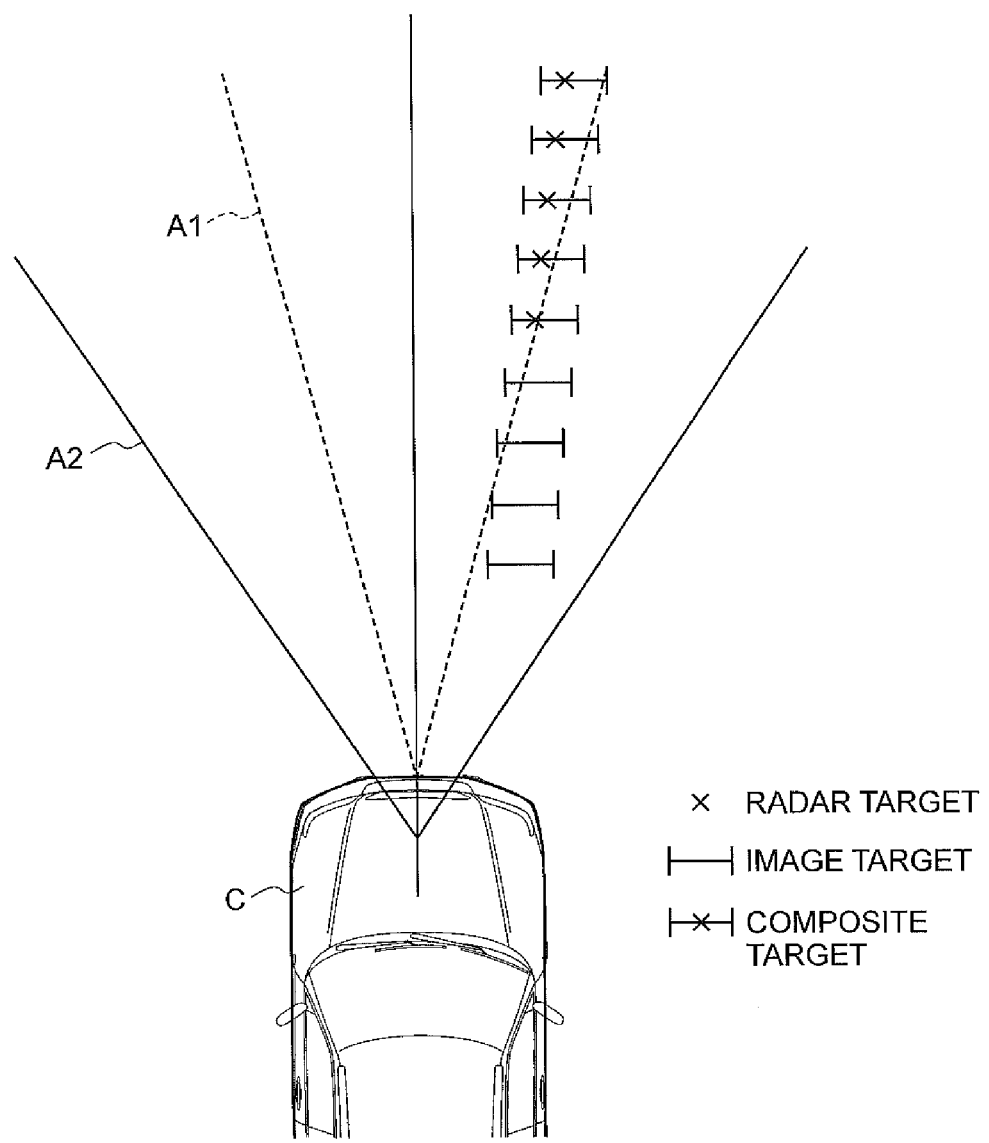
FIG. 2 is a diagram illustrating the detection ranges of a radar and a stereo camera.

FIG. 2 is a diagram illustrating the detection ranges A1 and A2 of the radar 12 and the stereo camera 13. As shown in FIG. 2, the detection range A1 of the radar 12 is narrower than the detection range A2 of the stereo camera 13. Therefore, a area which can be detected only by the stereo camera 13 and which is arranged outside the detection range A1 of the radar 12 is present diagonally in front of the vehicle. As shown in FIG. 2, while an object is present in the detection ranges A1 and A2 of the two sensors 12 and 13, the composite target is generated. However, when the object deviates from the detection range A1 of the radar 12, the composite target is not generated.

Returning to FIG. 1, the collision determination unit 24 calculates collision determination parameters for the radar target, the image target, and the composite target. For example, a target distance, collision probability, existence probability, and a collision lateral position are calculated as the parameters.

The target distance means the distance to the target in the traveling direction of the vehicle. The collision probability means the probability of the vehicle colliding with the object corresponding to the target. The existence probability means the probability that an object corresponding to a target will actually exist. The collision lateral position means a lateral position (the position of the vehicle in the width direction) where the vehicle is expected to collide with the object corresponding to the target. The target distance, the collision probability, the existence probability, and the collision lateral position are calculated on the basis of the moving state of each target. The parameters of each target are stored together with the target information of each target in a memory, such as a RAM, for a predetermined period of time and are read, if necessary.

The collision determination unit 24 determines a collision on the basis of the composite target. When the parameter of the composite target satisfies a predetermined threshold value, the collision determination unit 24 determines the probability of a collision with the object on the basis of whether a collision time is less than a predetermined threshold value. The collision time is calculated by dividing the distance to the object by the relative speed of the object (a variation in the distance to the object per unit time), using the target information of the composite target. For example, the determination result of the collision possibility is used to notify the driver of information or to control the braking or steering of the vehicle to assist collision avoidance.

In addition, the collision determination unit 24 determines a collision on the basis of the image target in a state in which the radar target is not generated and only the image target is generated. The collision determination unit 24 determines the possibility of a collision with the object, on the basis of whether the parameter of the image target satisfies a predetermined threshold value and whether the collision time is less than a threshold value. The collision time is calculated by dividing the distance to the object by the relative speed of the object, using the target information of the image target.

When it is determined that the object cannot be detected by the radar 12 and can be detected by the stereo camera 13 and the object is stationary in the traveling direction of the vehicle, the collision determination unit 24 performs collision determination on the basis of the detection result of the stereo camera 13, instead of the collision determination based on the composite target. The stationary state of the object is determined on the basis of the ratio of a first distance variation calculated from the speed of the vehicle and a second distance variation calculated from the detection result of the image, which are both a change in the distance between the vehicle and the object in the traveling direction of the vehicle per unit time. This determination process will be described below.

Figure 3:
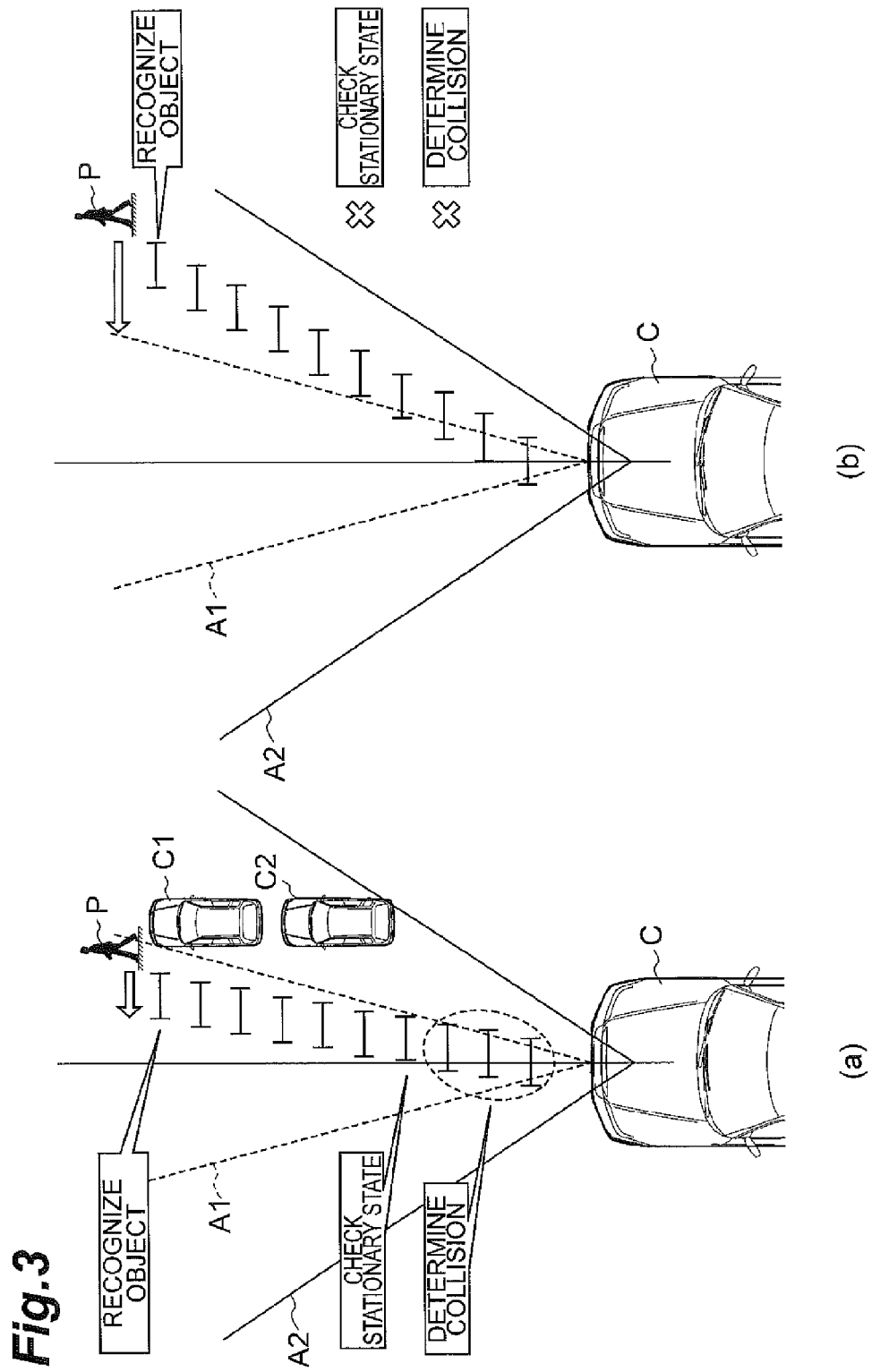
FIG. 3 is a diagram illustrating the state of a collision determination process according to the related art.

Next, the operation of the collision determination device will be described with reference to FIGS. 3 to 7. First, a collision determination process according to the related art will be described with reference to FIG. 3. FIG. 3 is a diagram illustrating the state of the collision determination process according to the related art.

FIG. 3 shows the detection ranges A1 and A2 of the radar 12 and the stereo camera 13 and a variation in the positions of the targets generated by the sensors 12 and 13 in a time series. For example, a pedestrian P who crosses in front of a vehicle C that is traveling is assumed as the target.

In the situation shown in FIG. 3 (*a*), the pedestrian P appears from behind the vehicles C1 and C2 in front the vehicle. In this case, the image target generation unit 22 recognizes the pedestrian P as an object and determines whether the object is in a stationary state. When the image target generation unit 22 determines that the object is in the stationary state, the collision determination unit 24 performs collision determination. It takes a relatively long processing time for the image target generation unit 22 to determine the stationary state from the relationship with the update cycle of the image. Therefore, for example, as shown in FIG. 3(*a*), in some cases, a collision avoidance assist operation is delayed or is not appropriately performed.

In the situation shown in FIG. 3(*b*), the pedestrian P crosses quickly in front of the vehicle C. In this case, the image target generation unit 22 recognizes the pedestrian P as an object and determines whether the object is in a stationary state. The image target generation unit 22 determines the stationary state, considering the speed of the object in a direction intersecting the traveling direction of the vehicle C, particularly, in a direction perpendicular to the traveling direction. Therefore, for example, as shown in FIG. 3(*b*), collision determination is not performed as long as the image target generation unit 22 does not check the stationary state.

Therefore, in the situations shown in FIGS. 3(*a*) and 3(*b*), the collision determination is not performed early. As a result, the collision avoidance assist operation is delayed or it is not appropriately performed.

Figure 4:
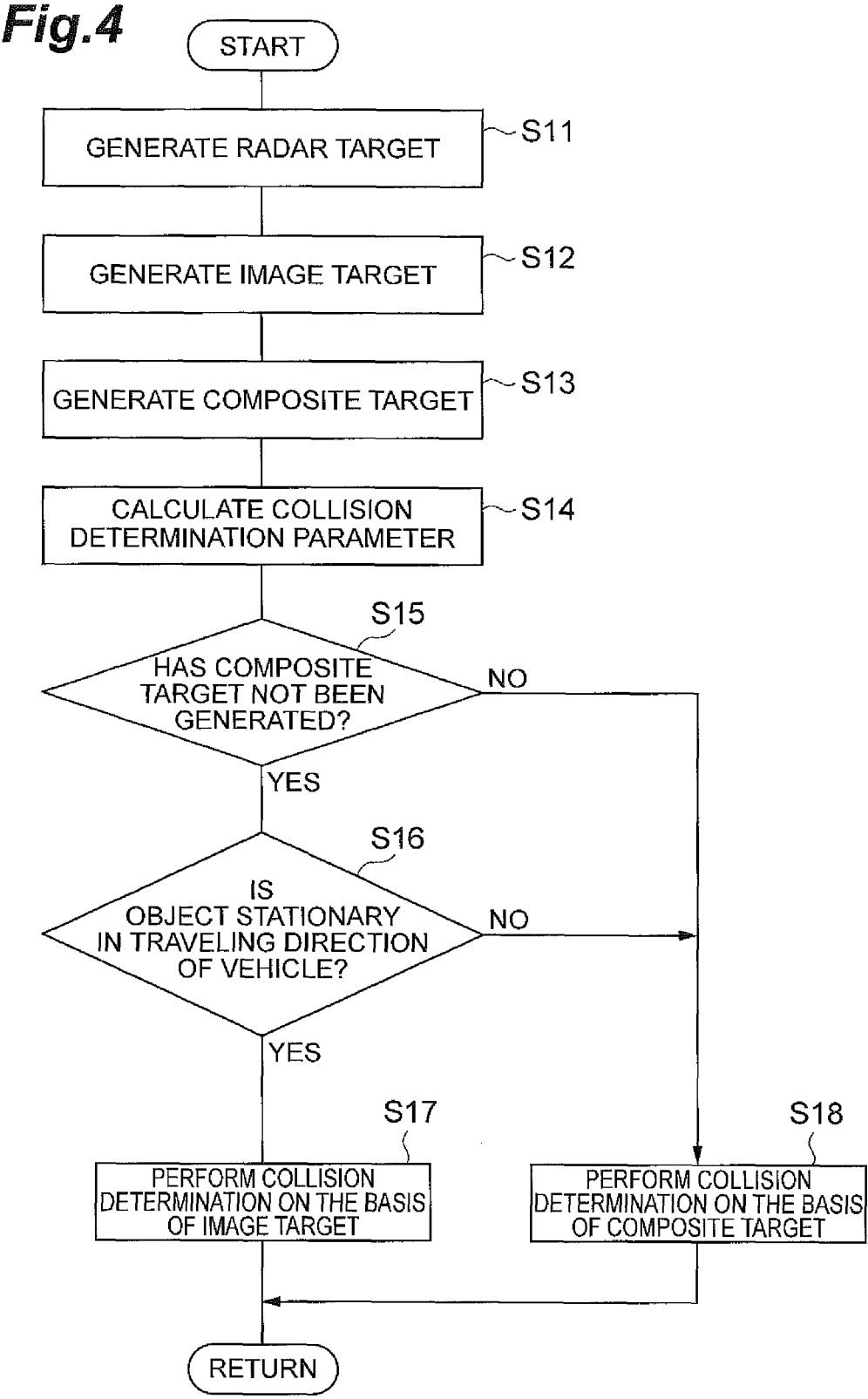
FIG. 4 is a flowchart illustrating the operation of the collision determination device.
Figure 5:
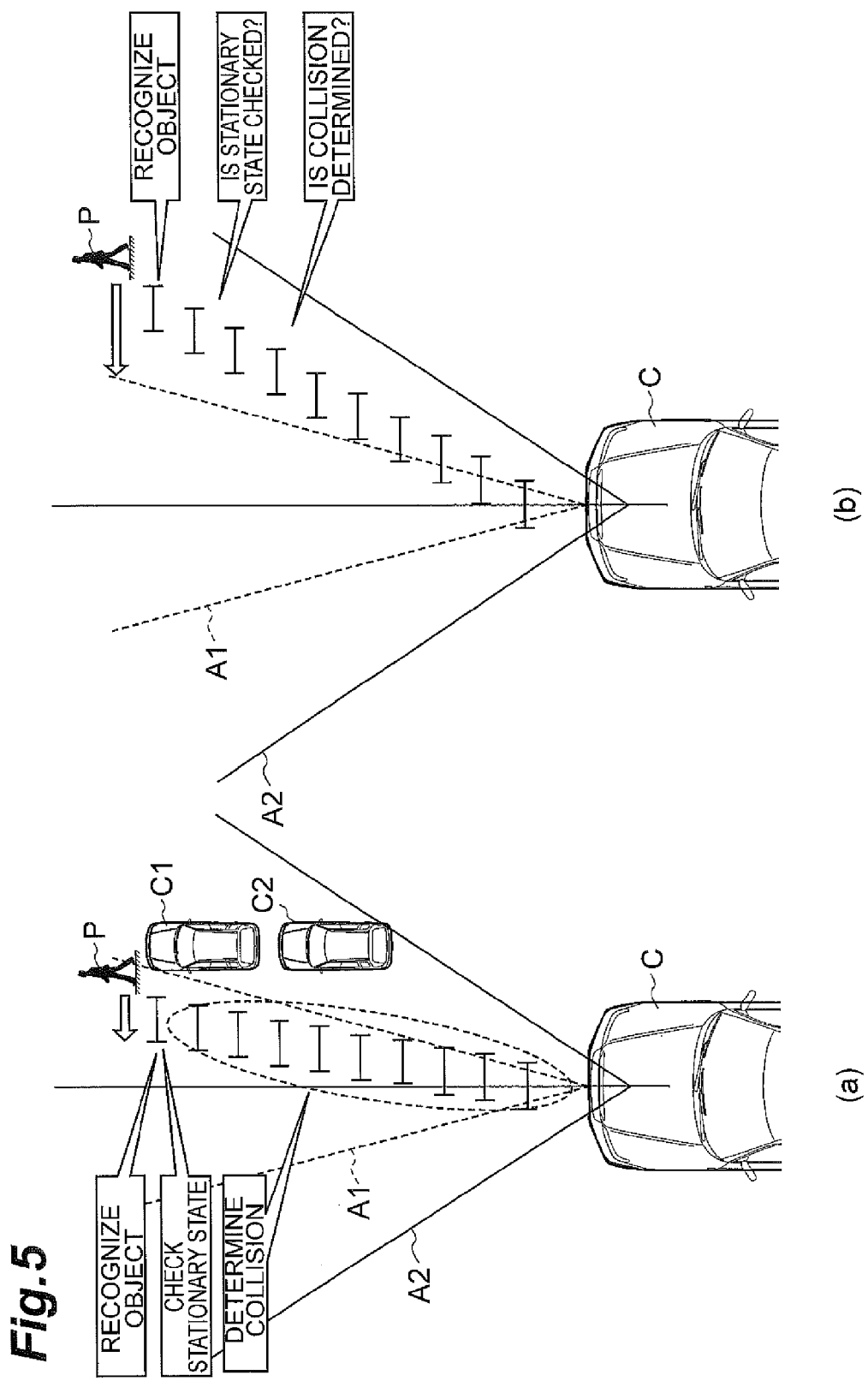
FIG. 5 is a diagram illustrating the state of a collision determination process shown in FIG. 4.

Next, the operation of the collision determination device will be described with reference to FIGS. 4 and 5. FIG. 4 is a flowchart illustrating the operation of the collision determination device. FIG. 5 is a diagram illustrating the state of the collision determination process shown in FIG. 4.

The collision determination device repeatedly performs the process shown in FIG. 4 for each processing cycle. As shown in FIG. 4, the radar target generation unit 21 generates a radar target when an object is present in the detection range of the radar 12 (Step S11). The image target generation unit 22 generates an image target when an object is present in the detection range of the stereo camera 13 (S12). The composite target generation unit 23 generates a composite target when the radar target and the image target are collated with each other (S13). The collision determination unit 24 generates the collision determination parameters for the radar target, the image target, and the composite targets (S14).

The collision determination unit 24 determines whether the object cannot be detected by the radar 12 and can be detected by the stereo camera 13, that is, whether the composite target has not been generated (S15). This situation occurs when the object is present outside the detection range of the radar 12 and is present in the detection range of the stereo camera 13, as shown in FIG. 2. In addition, this situation occurs when radar detection has failed and image detection has succeeded, that is, when the object is not detected by the radar 12 and is detected by the stereo camera 13.

When it is determined that the composite target has not been generated, the collision determination unit 24 determines whether the object is stationary in the traveling direction of the vehicle (S16). The stationary state of the object in the traveling direction of the vehicle means that the speed of the object in the traveling direction is zero or substantially zero.

In this determination process, it is determined whether the ratio (distance ratio) of a first distance difference (distance variation) calculated from the speed of the vehicle to a second distance difference (distance variation) calculated from the detection result of the image is less than a threshold value, which will be described below. Each of the first and second distance differences indicates a change in the distance between the vehicle and the object in the traveling direction of the vehicle per unit time.

When it is determined that the object is stationary in the traveling direction of the vehicle, the collision determination unit 24 performs the collision determination on the basis of the image target, that is, the detection result of the stereo camera 13 (S17). That is, even when the composite target has not been generated, the collision determination is performed for, for example, the pedestrian who crosses in front of the vehicle that is traveling, on the basis of the image target.

When it is determined in S15 that the composite target has not been generated or when it is determined in S16 that the object is stationary in the traveling direction of the vehicle, the collision determination unit 24 performs the collision determination on the basis of the composite target (S18).

FIG. 5 shows a change in the position of the target in the collision determination process shown in FIG. 4 in a time series, as contrasted with FIG. 3. In the collision determination process shown in FIG. 4, after the image target generation unit 22 recognizes the pedestrian as an object, the collision determination unit 24 determines the stationary state of the object, instead of the image target generation unit 22. Then, when checking the stationary state of the object, the collision determination unit 24 performs the collision determination.

Therefore, for example, in the situation shown in FIG. 5(a), immediately after the object is recognized, the stationary state is checked and it is possible to perform the collision determination early. In addition, for example, as shown in FIG. 5(b), when the stationary state is checked after the object is recognized, it is possible to perform the collision determination early. Therefore, it is possible to perform a collision avoidance operation early or to reliably perform the collision avoidance operation, on the basis of the result of the collision determination.

Figure 6:
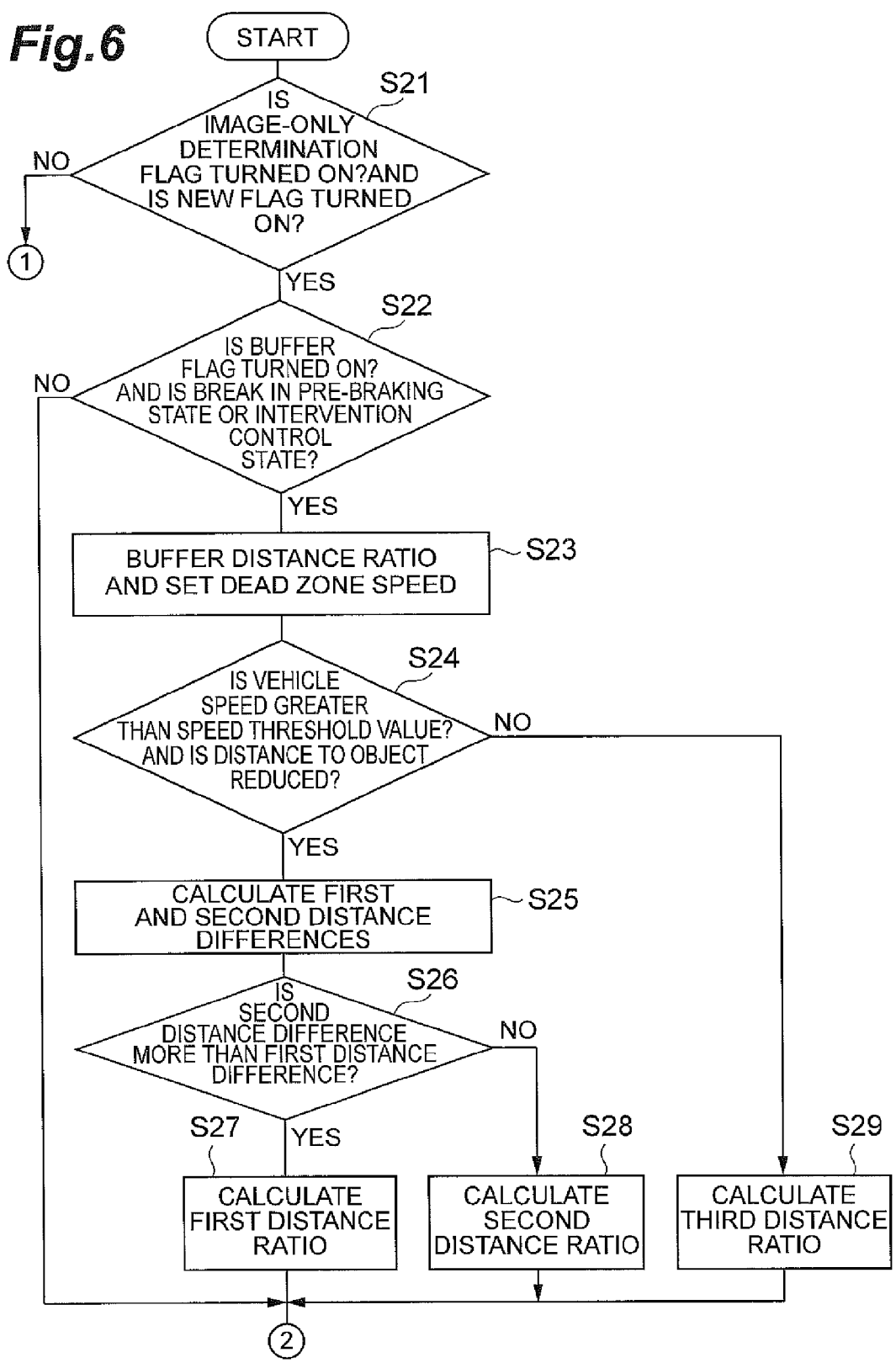
FIG. 6 is a flowchart illustrating the operation shown in FIG. 4 in detail.
Figure 7:
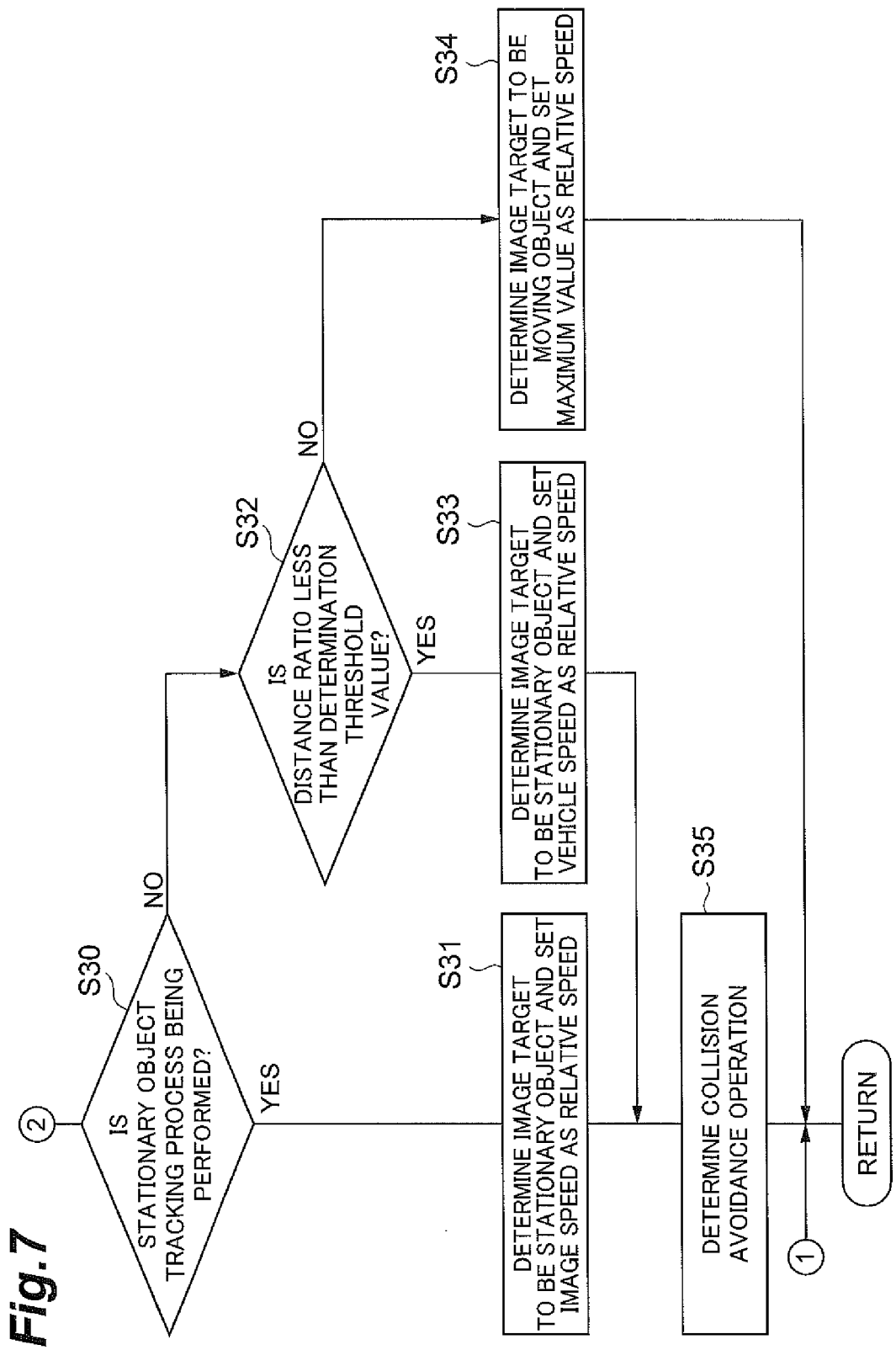
FIG. 7 is a flowchart illustrating the operation shown in FIG. 4 in detail.

Next, the detailed operation of the collision determination device will be described with reference to FIGS. 6 and 7. FIGS. 6 and 7 are flowcharts illustrating the operation of FIG. 4 in detail. Although not shown in FIG. 6, the generation of the radar target, the generation of the image target, the generation of the composite target, and the calculation of the collision determination parameter are performed, as described in S11, S12, S13, and S14 in FIG. 4.

As shown in FIGS. 6 and 7, the collision determination unit 24 determines whether an image-only determination flag is turned on and a new flag is turned on (S21). The image-only determination flag is a flag for allowing the collision determination based on the image target, instead of the composite target. The flag is turned on when the moving vector of the object in the traveling direction of the vehicle is less than a threshold value. The new flag is a flag indicating that a new target has been generated. When it is determined that the conditions of the two flags are not satisfied, the collision determination based on the image target is not performed. Therefore, the process ends.

On the other hand, when it is determined that the conditions of the two flags are satisfied, the collision determination unit 24 determines whether a buffer flag is turned on and the brake is in a pre-braking state or an intervention braking state (S22). The buffer flag is a flag for allowing the buffering of the target information of the image target. In addition, the pre-braking state or the intervention braking state means braking intervention which is performed as an example of the collision avoidance assist operation. When it is determined that the buffer flag and braking conditions are not satisfied, the process proceeds to S30, which will be described below.

On the other hand, when it is determined that the conditions of the buffer flag and the braking conditions are satisfied, the collision determination unit 24 buffers the distance ratio in the previous processing cycle and sets a dead zone speed used to calculate the distance ratio (S23). The distance ratio and the dead zone speed will be described below.

The collision determination unit 24 determines whether the speed of the vehicle is greater than a speed threshold value and whether the distance to the object is shorter than that in the previous processing cycle (S24). The speed threshold value is set to zero or substantially zero in order to determine the stationary state of the vehicle. The detection result of the speed sensor 11 is used as the speed of the vehicle and the target information of the image target is used as the distance to the object.

When it is determined that the conditions of the speed of the vehicle and the distance to the object are satisfied, the collision determination unit 24 calculates the first and second distance differences (distance variations) indicating a change in the distance between the vehicle and the object in the traveling direction of the vehicle per unit time (S25). The distance difference is a value indicating the degree of change in the distance to the object between the previous processing cycle and the current processing cycle and increases as the distance to the object decreases.

The first distance difference is a value obtained by multiplying the update cycle of the image by the speed of the vehicle. The detection result of the speed sensor 11 is used as the speed of the vehicle and the characteristic value of the stereo camera 13 is used as the update cycle of the image. That is, the first distance difference indicates the travel distance (absolute distance) of the vehicle for the processing cycle.

The second distance difference is a value obtained by subtracting the distance to the object in the current processing cycle from the distance to the object in the previous processing cycle. The target information of the image target is used as the distance to the object. That is, the second distance difference indicates the travel distance (relative distance) of the vehicle relative to the object for the processing cycle. Therefore, the second distance difference is equal to the first distance difference, assuming that the detection error of the stereo camera 13 is ideally zero when the speed of the object in the traveling direction of the vehicle is 0.

The collision determination unit 24 determines whether the second distance difference is more than the first distance difference (S26). When it is determined that the second distance difference is more than the first distance difference, the collision determination unit 24 calculates a first distance ratio (S27). In this case, the object is likely to move so as to approach the vehicle in the traveling direction of the vehicle.

On the other hand, when it is determined that the second distance difference is not more than the first distance difference, the collision determination unit 24 calculates a second distance ratio (S28). In this case, the object is likely to move so as to be separated from the vehicle in the traveling direction of the vehicle.

The first and second distance ratios (R1 and R2) are calculated by the following expression using the first and second distance differences (D1 and D2), the update cycle (Cu) of the image, and the dead zone speed (Vd):

$$R1 = \text{Max}(0, (D2 - Vd \cdot Cu)/D1 - 1) \quad (1); \text{ and}$$

$$R2 = \min(0, (D2 + Vd \cdot Cu)/D1 - 1) \quad (2).$$

Here, the dead zone speed is a speed which is set in order to determine the object which moves a little in the traveling direction of the vehicle as a stationary object, considering the detection error of the stereo camera 13. The dead zone speed is not set to zero, but is set to substantially zero, considering the assumed speed of the object in the traveling direction of the vehicle and the detection error of the stereo camera 13.

The first and second distance ratios are the ratio of a correction value of the second distance difference to the first distance difference and are calculated as values which decrease as the speed of the object in the traveling direction of the vehicle becomes closer to 0. The second distance difference is corrected considering the detection error of the stereo camera 13 and the speed of the object in the traveling direction of the vehicle. That is, the first and second distance ratios are used as indexes for determining whether the object is stationary in the traveling direction of the vehicle.

On the other hand, when it is determined in S24 that the conditions of the speed of the vehicle and the distance to the object are not satisfied, the collision determination unit 24 calculates a third distance ratio (S29). The third distance ratio is calculated as a maximum value ($\infty$). As a result, collision determination for a "stationary object", such as the pedestrian who crosses a road, is not performed.

When the distance ratio is calculated in S27, S28, or S29, the collision determination unit 24 determines whether stationary object tracking process is being performed (S30). The stationary object tracking process is performed when the moving vector of the object in the traveling direction of the vehicle is less than a threshold value. Whether the stationary object tracking process is being performed is determined on the basis of the flag supplied from the composite target generation unit 22.

When it is determined that the stationary object tracking process is being performed, the collision determination unit 24 determines that the object is a stationary object and sets an image speed used for tracking as the relative speed of the object' used for collision determination (S31). The image speed is calculated as a variation in the distance to the object per unit time, using the target information of the image target. This is because the object which has been tracked as a stationary object is likely to be a stationary object.

On the other hand, when it is determined that the stationary object tracking process is not being performed, the collision determination unit 24 determines whether the distance ratio is less than a determination threshold value (S32). The determination threshold value is a threshold value for determining whether the object is a stationary object which barely moves in the traveling direction of the vehicle. When it is determined that the distance ratio is less than the determination threshold value, the collision determination unit 24 determines that the object is a stationary object and sets the vehicle speed detected by the speed sensor 11 as the relative speed of the object used for collision determination (S33). The reason is that, since the speed of the object with the distance ratio less than the determination threshold value is close to zero, the object is likely to be a stationary object.

On the other hand, when it is determined that the distance ratio is not less than the determination threshold value, the collision determination unit 24 determines that the object is a moving object and sets a maximum value ($\infty$) as the relative speed of the object used for collision determination (S34). The reason is that, since the speed of the object with the distance ratio that is equal to or greater than the determination threshold value is high in the traveling direction of the vehicle, the object is likely to be a moving object. As a result, collision determination for a "stationary object", such as the pedestrian who crosses a road, is not performed.

When it is determined in S31 or S33 that the object is a stationary object, the collision determination unit 24 performs the collision determination on the basis of the image target (S35). When the parameter of the image target satisfies a predetermined threshold value, the collision determination unit 24 divides the distance to the object by the set relative speed of the object to calculate the collision time and determines the possibility of a collision with the object on the basis of whether the collision time is less than a threshold value. When it is determined that the possibility of the collision is high, the collision determination unit 24 determines to perform a collision avoidance assist operation. On the other hand, when it is determined that the possibility of the collision is low, the collision determination unit 24 determines not to perform the collision avoidance assist operation.

As described above, when it is determined that the object cannot be detected by the radar 12 and can be detected by the stereo camera 13 and the collision determination unit 24 determines that the object is stationary in the traveling direction of the vehicle, the collision determination device according to the embodiment of the invention performs collision determination on the basis of the detection result of the stereo camera 13, instead of the collision determination based on the composite target. Therefore, the processing time is reduced by the determination of the stationary object by the collision determination unit 24 and it is possible to perform collision determination early on the basis of the detection result of the stereo camera 13.

In addition, it may be determined whether the object is stationary in the traveling direction of the vehicle, on the basis of the ratio of the first distance variation which is calculated from the speed of the vehicle as a change in the distance between the vehicle and the object in the traveling direction of the vehicle per unit time and the second distance variation which is calculated from the detection result of the image as a variation in the distance between the vehicle and the object in the traveling direction of the vehicle per unit time. In this case, it is possible to determine the stationary state of the object at a high speed on the basis of the ratio of the first distance variation and the second distance variation.

When the ratio of the first distance variation and the second distance variation is less than a threshold value, the object may be determined to be stationary in the traveling direction of the vehicle.

When it is determined that the object is present outside the detection range of the radar 12 and is present in the detection range of the stereo camera 13 and the object is stationary in the traveling direction of the vehicle, the collision determination may be performed on the basis of the detection result of the stereo camera 13.

When it is determined that the object is not detected by the radar 12 and is detected by the stereo camera 13 and the object is stationary in the traveling direction of the vehicle, the collision determination may be performed on the basis of the detection result of the stereo camera 13.

When the composite target is generated and the generated composite target is cancelled, the collision determination may be performed on the basis of the detection result of the stereo camera 13.

The detection range of the radar 12 and the detection range of the stereo camera 13 may partially overlap each other and there may be a area which is not detected by the radar 12 and is detected by the stereo camera 13.

The radar 12 may detect an object in front of the vehicle using millimeter waves.

The above-described embodiment is the preferred embodiment of the collision determination device and the collision determination method according to the invention. However, the collision determination device and the collision determination method according to the invention are not limited to those described in the embodiment. The collision determination device and the collision determination method according to the invention may be modified without departing from the scope and spirit of the invention described in the claims or they may be applied to other techniques.

For example, in the above-described embodiment, the functions of the radar target generation unit 21 and the image target generation unit 22 are implemented by the ECU 20. However, the function of the radar target generation unit 21 may be implemented by an independent ECU, for example, an ECU for a radar sensor and the function of the image target generation unit 22 may be implemented by an independent ECU, for example, an ECU for an image sensor.

In the description of the embodiment, the detection ranges A1 and A2 of the radar 12 and the stereo camera 13 are symmetric with respect to the traveling direction of the vehicle and symmetrically overlap each other. However, the detection ranges A1 and A2 of the two sensors 12 and 13 may partially overlap each other and there may be a area which is not detected by the radar 12 and is detected by the stereo camera 13. The detection ranges A1 and A2 are not necessarily symmetric with respect to the traveling direction of the vehicle and do not necessarily symmetrically overlap each other.

REFERENCE SIGNS LIST

11: SPEED SENSOR
12: RADAR
13: STEREO CAMERA
20: ECU
21: RADAR TARGET GENERATION UNIT
22: IMAGE TARGET GENERATION UNIT
23: COMPOSITE TARGET GENERATION UNIT
24: COLLISION DETERMINATION UNIT

The invention claimed is:

1. A collision determination device comprising:
    a radar detection unit that detects an object in front of a vehicle using a radar wave;
    an image detection unit that captures an image in front of the vehicle and detects the object using the captured image; and
    a collision determination unit that determines a collision between the vehicle and the object on the basis of a composite target which is generated using a detection result of the radar detection unit and a detection result of the image detection unit,
    wherein the collision determination unit performs collision determination on the basis of the detection result of the image detection unit, instead of the collision determination based on the composite target, when it is determined that the object cannot be detected by the radar detection unit and can be detected by the image detection unit and the object is stationary in a traveling direction of the vehicle.

2. The collision determination device according to claim 1, wherein the collision determination unit determines whether the object is stationary in the traveling direction of the vehicle, on the basis of a ratio of a first distance variation which is calculated from a speed of the vehicle as a change in a distance between the vehicle and the object in the traveling direction of the vehicle per unit time and a second distance variation which is calculated from the detection result of the image as a change in the distance between the vehicle and the object in the traveling direction of the vehicle per unit time.

3. The collision determination device according to claim 2, wherein the collision determination unit determines that the object is stationary in the traveling direction of the vehicle when the ratio of the first distance variation and the second distance variation is less than a threshold value.

4. The collision determination device according to claim 1, wherein the collision determination unit performs the collision determination on the basis of the detection result of the image detection unit when it is determined that the object is present outside a detection range of the radar detection unit and is present in a detection range of the image detection unit and the object is stationary in the traveling direction of the vehicle.

5. The collision determination device according to claim 1, wherein the collision determination unit performs the collision determination on the basis of the detection result of the image detection unit when it is determined that the object is not detected by the radar detection unit and is detected by the image detection unit and the object is stationary in the traveling direction of the vehicle.

6. The collision determination device according to claim 1, wherein the collision determination unit performs the collision determination on the basis of the detection result of the image detection unit when the composite target is generated and the generated composite target is cancelled.

7. The collision determination device according to claim 1, wherein the detection range of the radar detection unit and the detection range of the image detection unit partially overlap each other, and
    there is a area which is not detected by the radar detection unit and is detected by the image detection unit.

8. The collision determination device according to claim 1, wherein the radar detection unit detects the object in front of the vehicle using a millimeter wave.

9. A collision determination method comprising:

detecting an object in front of a vehicle using a radar wave;

capturing an image in front of the vehicle and detecting the object using the captured image;

determining a collision between the vehicle and the object on the basis of a composite target which is generated using a detection result of the radar detection and a detection result of the image detection; and performing collision determination on the basis of the detection result of the image detection, instead of the collision determination based on the composite target, when it is determined that the object cannot be detected by the radar detection and can be detected by the image detection and the object is stationary in a traveling direction of the vehicle.

* * * * *